United States Patent
Olah

(10) Patent No.: US 8,104,500 B2
(45) Date of Patent: Jan. 31, 2012

(54) ACOUSTIC LIQUID LEVEL DETECTION

(75) Inventor: Laslo Olah, Dallas County, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 431 days.

(21) Appl. No.: 12/148,255

(22) Filed: Apr. 18, 2008

(65) Prior Publication Data

US 2009/0260432 A1 Oct. 22, 2009

(51) Int. Cl.
B67D 7/44 (2010.01)
B67D 7/04 (2010.01)
B67D 7/32 (2010.01)

(52) U.S. Cl. ............ 137/213; 73/290 B; 73/291; 73/298
(58) Field of Classification Search ............... 73/290 B, 73/290 R, 290 V, 291–334; 137/213
See application file for complete search history.

(56) References Cited

U.S. PATENT DOCUMENTS

| | | | | |
|---|---|---|---|---|
| 2,194,501 A * | 3/1940 | Hooper et al. | ................. | 141/59 |
| 2,784,561 A * | 3/1957 | Postlewait | ................... | 137/109 |
| 3,363,641 A * | 1/1968 | Mylander | ................... | 137/393 |
| 3,526,256 A * | 9/1970 | Jones | ............................ | 141/207 |
| 3,812,888 A * | 5/1974 | Dalton | .......................... | 141/39 |
| 3,814,146 A * | 6/1974 | Mesh | ................................ | 141/1 |
| 3,929,155 A * | 12/1975 | Garretson | .................... | 137/430 |
| 3,970,099 A * | 7/1976 | Murphy et al. | .......... | 137/101.25 |
| 4,083,387 A * | 4/1978 | Stieber et al. | ................. | 141/95 |
| 4,191,208 A * | 3/1980 | Mylander | .................... | 137/393 |
| 4,313,459 A * | 2/1982 | Mylander | .................... | 137/416 |
| 4,405,000 A * | 9/1983 | Fuller | .......................... | 141/198 |
| 4,543,979 A * | 10/1985 | Olmsted et al. | .......... | 137/315.08 |
| 4,667,694 A * | 5/1987 | Dalton | ......................... | 137/154 |
| 4,856,564 A * | 8/1989 | Obal | ................................ | 141/95 |
| 5,226,320 A * | 7/1993 | Dages et al. | ................ | 73/290 V |
| 5,819,818 A * | 10/1998 | Frawley | ......................... | 141/95 |
| 6,000,359 A * | 12/1999 | Hudson et al. | ............... | 116/109 |
| 6,705,362 B2 * | 3/2004 | Pisot | ............................. | 141/351 |
| 6,725,800 B2 * | 4/2004 | Hawkins | ...................... | 116/109 |
| 6,983,654 B2 * | 1/2006 | Balin et al. | ................. | 73/290 V |
| 2002/0011105 A1* | 1/2002 | Snelling et al. | ............... | 73/295 |
| 2008/0178670 A1* | 7/2008 | McTier et al. | ................. | 73/291 |

* cited by examiner

Primary Examiner — David Rogers
(74) Attorney, Agent, or Firm — Jack A. Kanz

(57) ABSTRACT

The filling noise generated inside a pressurized container when liquid is injected into the container is detected at the outer end of a vent tube which extends into the container. When the level of liquid in the container reaches the lower end of the vent tube, the filling noise detected at the outer end is abruptly diminished. This abrupt change is detected and used to automatically terminate filling of the tank.

5 Claims, 3 Drawing Sheets

ACOUSTIC LIQUID LEVEL DETECTION

This invention relates to determining and controlling the level of liquid in an enclosed pressurized container. More particularly, it relates to apparatus and methods for monitoring noise generated when filling a pressurized container with liquid to determine the level of liquid in the container and to control the input of liquid into the container.

Liquefied petroleum gas (LPG) such as butane and propane are commonly used gaseous fuels which are easily liquefied. LPG is ordinarily stored and transported as a liquid but, since its boiling point is lower than typical ambient temperatures, there is a continual production of vapor under pressure. However, the vapor pressure of LPG at typical ambient temperatures is not so great as to require extremely strong or expensive storage tanks. Therefore, the liquefied fuel can be stored and transported in relatively inexpensive pressurized containers.

LPG fuels in the liquid state exhibit a substantial coefficient of thermal expansion. Thermal expansion of the liquid can produce extremely high pressures which are much greater than the vapor pressure of the gas. It is therefore important that storage tanks not be completely filled with liquid since thermal expansion of the liquid could rupture the tank. To avoid this problem LPG storage tanks and the like are never completely filled with liquid. Instead, the tanks are commonly filled to a predetermined liquid level, leaving a gas void (termed a "head space") above the liquid which is sufficiently large to absorb the maximum possible thermal expansion of the liquid.

A number of practices have been used to insure safe and proper filling of propane and butane tanks. In one method the operator weighs the tank while it is being filled and terminates input flow when the appropriate weight for the filled tank is reached. This requires that the operator know the weight and volume of the tank in advance and carefully monitor the filling operation to stop the input flow at the appropriate time. Float mechanisms mounted inside the tanks which respond to liquid level to control signaling and/or valve mechanisms have also been used. The most common practice employs a vent tube (sometimes referred to as a downpipe) which extends from the top of the tank to the desired maximum liquid level inside the tank. When the liquid in the tank reaches this level, liquid is forced out through the vent tube. The liquid immediately evaporates and produces a dense cloud of vapor which indicates that the desired liquid level has been reached. The operator must then immediately close the input valve to prevent further liquid from entering the tank. All these techniques require careful attention on the part of the operator to prevent liquid from filling the head space.

Determining the weight of added liquid is obviously impractical in many situations; and mechanical float apparatus is expensive and unreliable. The vent tube technique, as commonly used, results in the release and loss of significant amounts of gaseous fuel and thus may endanger the operators. Furthermore, liquefied gas injected into a container under pressure tends to become violently agitated and small amounts of liquid may enter the vent tube before the liquid level reaches the end of the vent tube. This can result in a false full signal. Furthermore, a bubble of gas and liquid entrapped in the vent tube at the end of the fill cycle may remain in the vent tube and produce a false full signal at the beginning of the next filling operation. For these and other reasons a more reliable, precise and fuel-conserving system for safely and accurately determining the liquid level of LPG in a pressurized container during filling operations has long been sought.

In accordance with the present invention a fill level detection system is provided in which the full condition is determined by sensing the noise generated by liquid entering the tank as detected at the exit end of the vent tube. As liquid enters the tank during the filling operation, distinct detectable vibrations are generated which are amplified by and characteristic of the gas volume in the tank. This acoustic noise (referred to herein as "filling noise") is readily detected at the exit end of the vent tube. However, when liquid covers the end of the vent tube extending into the tank, the filling noise detectable at the exit end of the vent tube diminishes dramatically. A detector mounted near the exit of the vent tube senses the change in detected filling noise and generates a signal which is transmitted to the filling source to stop the filling operation.

Apparatus employing the principles of the invention vastly reduce the amount of fuel vented during the filling operation and accurately determine the full condition without operator intervention. The sensing apparatus may be readily adapted to virtually all conventional containers which employ a vent tube without modification of the container and may be fully integrated with electronically controlled filling systems to eliminate operator error in determining and controlling fill level. Other features and advantages of the invention will become more readily understood from the following detailed description taken in connection with the appended claims and attached drawing in which:

The drawing is incorporated into and forms part of the specification to illustrate exemplary embodiments of the invention. For clarity of illustration, like reference numerals designate corresponding elements throughout the drawing.

It will be recognized that the principles of the invention may be utilized and embodied in many and varied forms, and that various materials, component parts and arrangements of components may be employed in utilizing the invention. In order to demonstrate these principles, the invention is described herein by reference to specific preferred embodiments. The invention, however, is not limited to the specific forms illustrated and described in detail.

Figure 1:
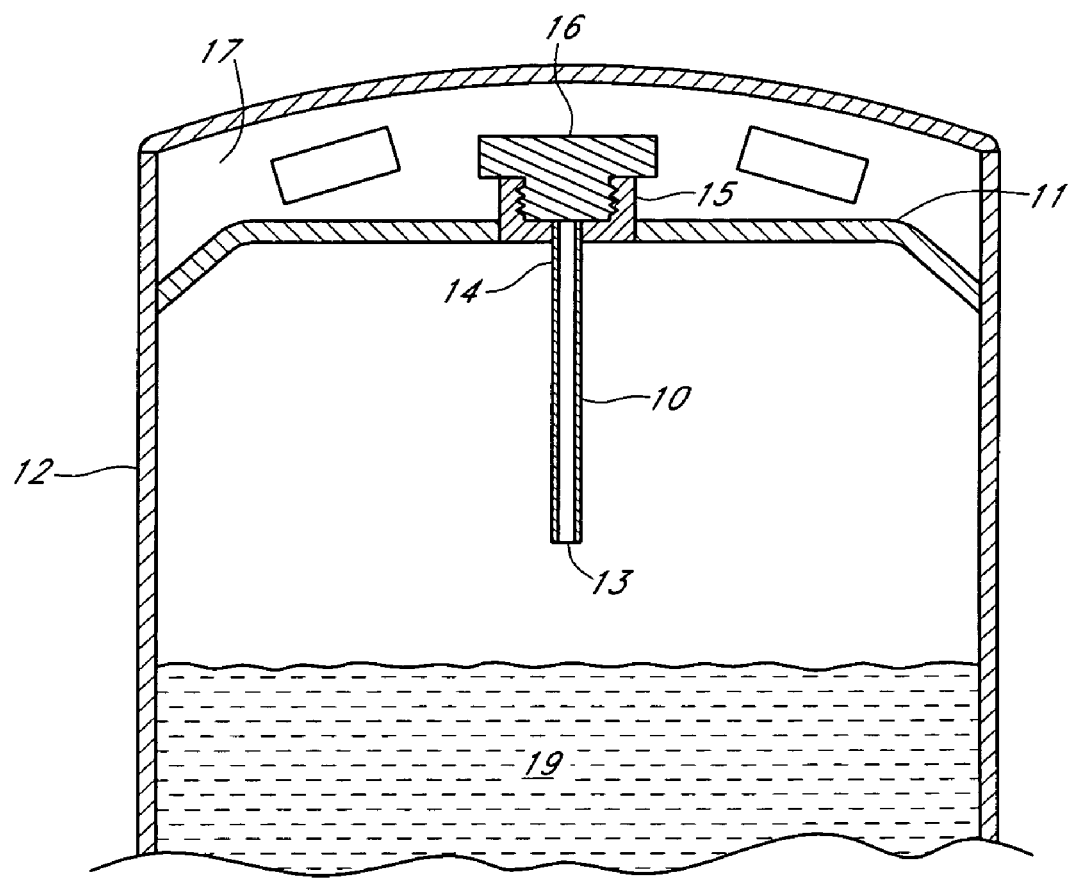
FIG. 1 is a sectional view, partially broken away, illustrating a pressurized container employing a conventional vent tube used for determining fill level.

A vent tube fill detector arrangement employing the invention is schematically illustrated in FIG. 1 wherein a vent tube 10 (sometimes referred to as a "down pipe") is mounted in the top wall 11 of a storage tank 12 or other container for LPG. The lower end 13 of vent tube 10 is suspended at the predetermined desired level of liquid 19 when tank 12 is considered full, leaving a predetermined volume of head space above the liquid 19. The upper end 14 of vent tube 10 opens into a threaded coupler 15 which is closed by a threaded plug 16. The vent tube and coupler arrangement illustrated in FIG. 1 should be considered as schematic only. Vent tubes are often combined with the fill valve assembly and may vent vertically as illustrated in FIG. 1. In other arrangements, the vent tube may terminate in a chamber which defines a laterally projecting exit which is controlled by a vent plug. As will be described hereinafter, apparatus employing the invention may be used in connection with most conventional vent tubes regardless of whether the exit vent projects upwardly, laterally or otherwise. A rail 17 or similar protective device ordinarily extends above the top wall 11 of tank 12 to protect valves, gauges, etc. (not shown) ordinarily mounted on the top wall 11.

During conventional filling operations the plug 16 is removed (or reconfigured to define a vent opening) and liquid injected into the tank through a fill valve (not shown). As the liquid level rises, gas is forced out through vent tube 10. Since LPG remains liquid at ambient temperatures only under pressure, the openings at the ends 13, 14 of vent tube 10 are relatively small so that the tank remains pressurized while permitting a small volume of gas to continuously escape through vent tube 10 during filling. When the level of liquid 19 reaches the lower end 13 of vent tube 10, liquid is forced into vent tube 10. When liquid is forced through vent tube 10, it immediately vaporizes to form a dense vapor exiting the vent opening, indicating that the level of liquid 19 has reached the predetermined fill level. The filling operation is then terminated and plug 16 re-inserted into coupler 15 to seal the tank 12.

In ordinary filling operations, liquid entering tank 12 becomes violently agitated and, as the liquid sloshes around in tank 12, small volumes of liquid may be intermittently drawn into vent tube 10 before the level of liquid reaches the lower end 13 of vent tube 10. These small volumes of liquid are vaporized in vent tube 10 and exit the vent tube in small bursts of vapor. Since these small bursts of vapor produce a distinct sound, the opening in the upper end is commonly referred to as a "spit valve." The bursts of liquid which enter the vent tube during filling before the tank is considered full must be vented to avoid false full signals. Accordingly, the exit opening in the spit valve must be large enough to allow a substantial volume of vapor to escape during the filling operation.

Figure 2:
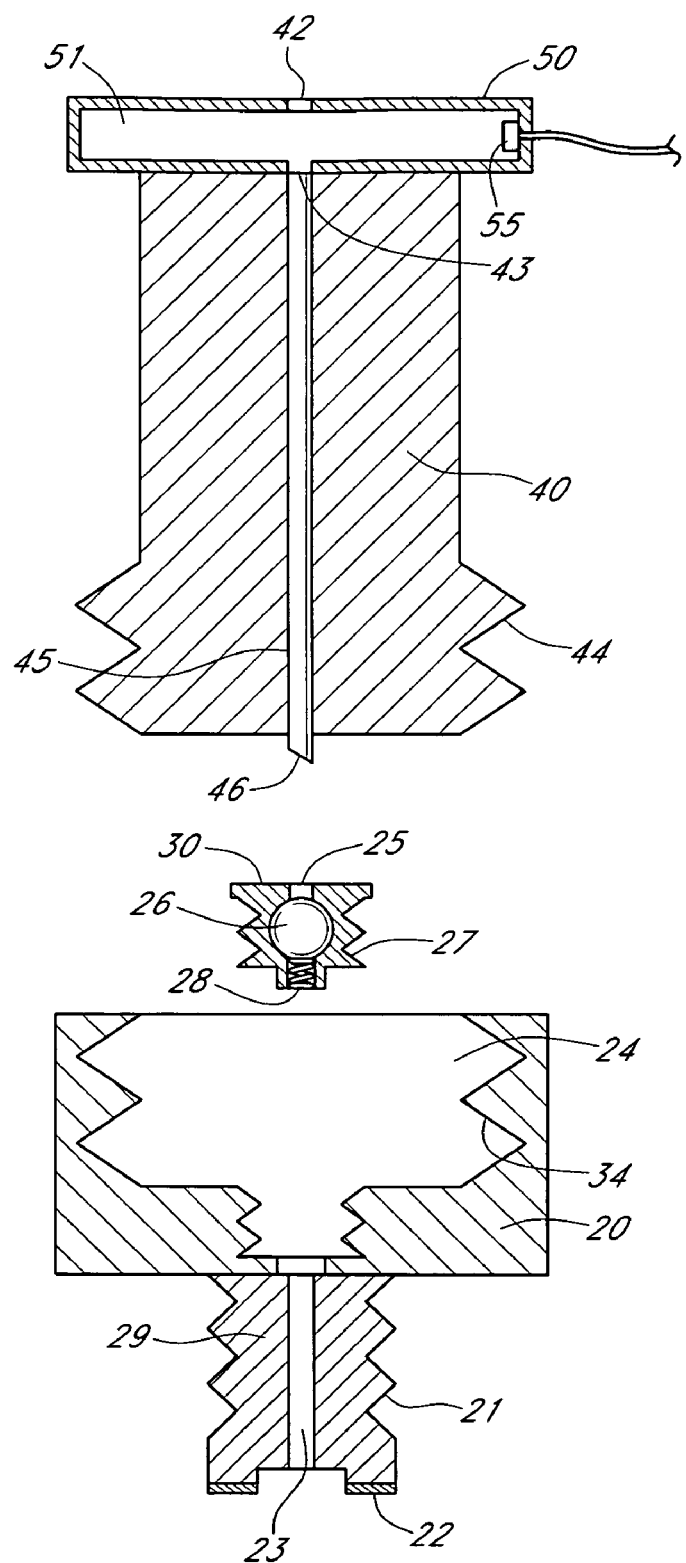
FIG. 2 is an enlarged and exploded sectional view of a preferred embodiment of apparatus employing the invention for detecting fill level of liquid in a pressurized container.

FIG. 2 illustrates apparatus for detecting liquid fill level in accordance with the invention in pressurized containers employing a conventional vent tube. In the apparatus illustrated the neck 29 of an adapter plug 20 is provided with external threads 21 which mate with the internal threads of coupler 15. Plug 16 may thus be removed and replaced by an adapter plug 20. To insure complete sealing engagement, the lower face of neck 29 may carry a gasket 22 or the like which engages the top wall 11 of tank 12 surrounding the upper end 14 of vent tube 10 within coupler 15.

A connection conduit 23 connects the upper end 14 of vent tube 10 with a threaded cavity 24 in adapter plug 20. A check valve 30 comprising a valve seat 27, a ball 26 and a spring 28 is mounted in the base of threaded cavity 24. Ball 26 is urged upwardly by a spring 28 (and by gas pressure inside the tank 12) to seat in and seal aperture 25, thus preventing flow of gas from tank 12 into threaded cavity 24.

A removable detector plug 40 is adapted to connect with adapter plug 20 when the tank is being filled. The lower end of adapter plug 20 carries external high pitch threads 44 which mate with internal threads 34 in threaded cavity 24. Other conventional connection means, such as quick-connect couplers or the like, which provide fluid communication into the detector plug 40 may be employed as desired.

Detector plug 40 carries a chamber 50 having a chamber cavity 51 which communicates with an extension tube 45. The lower end 46 of extension tube 45 terminates in a slanted or otherwise irregular opening. When detector plug 40 is seated in cavity 24, the lower end 46 of extension tube 45 projects into aperture 25 and unseats ball 26, thereby forming an open extension conduit allowing gas to flow from vent tube 10 into connection conduit 23; through aperture 25 into extension tube 45; and through opening 43 into cavity 51. Gas entering cavity 51 is allowed to escape through exit vent 42. It will be appreciated that when detector plug 40 is properly seated in adapter plug 20, an open continuous conduit is provided which connects the interior of tank 12 with cavity 51 in chamber 50.

An acoustical sensor 55 is mounted in cavity 51 or on chamber 50 to detect the filling noise generated in tank 12 during filling operations. Since the filling noise includes a wide range of frequencies and is relatively loud, it may be detected by relatively simple and inexpensive audio microphones or the like, indicated in FIG. 2 as sensor 55. Sensor 55 is coupled with suitable amplifier and discriminating circuitry which produces a signal responsive to the filling noise detected.

As discussed above, sensor 55 is situated to detect acoustic filling noise generated in tank 12 via the conduit formed by vent tube 10, connection conduit 23 and extension tube 45. So long as the level of liquid 19 remains below the lower end 13 of vent tube 10, sensor 55 is acoustically connected directly to the gaseous portion of the internal volume of the tank 12. However, when the surface level of liquid 19 rises above and submerges the lower end 13 of vent tube 10, the liquid 19 blocks the open acoustic conduit between sensor 55 and the head space in the interior of tank 12, sharply diminishing the intensity of filling noise detectable by sensor 55. This drop in detected filling noise can be easily determined and represents a reliable and precise indication that the liquid level in the tank has reached the desired fill point.

Figure 3:
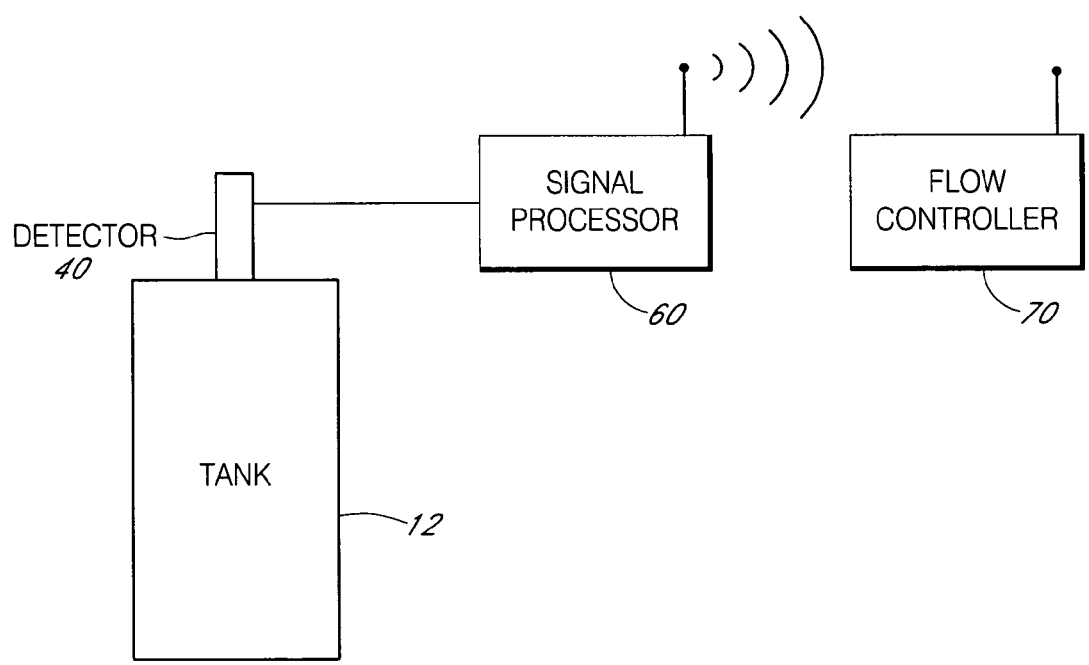
FIG. 3 is a diagrammatic illustration of a flow control system employing the invention to detect liquid level in a pressurized container and control input of liquid into the container.

FIG. 3 schematically illustrates apparatus and methods for utilizing the drop in detected filling noise to control the filling operation. With detector plug 40 connected to adapter plug 20, the sensor 55 is in acoustic communication with the interior of tank 12. When filling of the tank begins, filling noise detected by sensor 55 in detector plug 40 is transmitted to a signal processor 60. Signal processor 60 generates a stop flow or cut-off signal when a sharp drop in detected filling noise is determined. The stop flow signal is transmitted to flow controller 70 (preferably via radio signal) which in turn operates to close the fill valve and stop flow of liquid into the tank 12.

It should first be noted that apparatus for practicing the invention may be readily adapted to virtually all LPG containers which employ a vent tube fill detector by simply replacing the vent plug 16 with a suitably designed adapter plug 20. No other modification of the tank or associated valves, etc., is required. Furthermore, the detector plug 40 may be quickly and easily connected to the adaptor plug by quick-connect couplings or the like so that the fill level detection apparatus may be connected to the tank only during filling operations.

Since the fill level detector system of the invention relies on detecting a drop in detected filling noise at the exit end of the vent tube instead of visual observation of vaporized liquid exiting the spit valve, it is only necessary that a continuous open conduit be provided between the lower end 13 of vent tube 10 and the sensor 55. Accordingly, the vent tube 10 need not be vented to atmosphere through a spit valve. However, to ensure that small volumes of liquid which may intermittently enter the vent tube 10 during filling do not prematurely block the acoustic conduit to sensor 55, a relatively small exit vent opening 42 may be provided in chamber 50. Exit vent opening 42 thus allows a small volume of vapor to pass continuously through the conduit formed by vent tube 10, connection conduit 23, extension tube 45 and cavity 51 and thus allows small volumes of liquid to be vaporized and escape without blocking the acoustic conduit. The size of exit vent opening 42, however, can be relatively small. The amount of gas vented during filling operations, therefore, is substantially less than that vented through a conventional spit valve, thus minimizing fuel loss and substantially reducing safety issues resulting from vented gas.

It should be noted that the invention requires no electrical devices be associated with the storage tank other than sensor which is powered by signal processor 60. Signal processor 60 may be, for example, a portable hand-held battery-powered unit which is connected to the sensor 55 by a single cable. Since detector plug 40 is only connected to the tank during filling operations, any danger associated with electrical devices attached to the storage tank is totally eliminated. Furthermore, the stop flow signal generated by signal processor 60 may be adapted to control conventional radio operated emergency flow cut-off devices and the like.

It will be recognized that the volume and frequencies of filling noise generated when injecting liquid into a pressurized container may be affected by a wide range of variables such as tank volume, gas pressure, composition of liquid, design of fill valve, etc. However, the invention relies on detecting the characteristic drop in filling noise detected at the exit end of the vent tube when the lower end of the vent tube becomes submerged in the liquid. While generation of filling noise is not necessarily affected by submerging the lower end of the vent tube in liquid, transmission of filling noise through the vent tube is substantially attenuated when liquid covers the lower end of the vent tube. Thus, since only a drop in detected filling noise need be detected to determine the filling point, relatively simple acoustic sensors and signal processors may be employed to detect the full condition and generate an appropriate stop fill signal.

Since most LPG tanks which employ a vent tube and spit valve may be converted to use the invention by merely replacing the vent plug with an adapter plug as described, such LPG tanks can be readily converted to utilize the invention without major modification.

It will be appreciated that the invention is not limited to any particular dimensions, materials or arrangement of components. Various materials of construction and conventional components will be found suitable by those skilled in the art; and the arrangement, size and location of the various components may be varied as desired.

While only exemplary embodiments of the invention have been illustrated and described in detail herein, it will be readily recognized that the principles of the invention may be used in various forms to provide detection signaling and control apparatus for filling pressurized liquid containers. It is to be understood, therefore, that even though numerous characteristics and advantages of the invention have been set forth in detail herein, the foregoing description, together with details of the structure and function of the various embodiments, is to be considered illustrative only. Various changes and modifications may be made in detail, especially in matters of shape, size and materials as well as arrangement and combination of parts, without departing from the spirit and scope of the invention as defined by the appended claims.

What is claimed:

1. Liquid level detection apparatus comprising:
   (a) a vent tube having a first end terminating inside an enclosed pressurized container and a second end terminating in a hollow chamber outside said container;
   (b) detection means positioned to detect filling noises generated by liquid entering said container and transmitted through said vent tube, said detection means comprising:
      (i) a check valve positioned to close the second end of said vent tube;
      (ii) a removable extension tube having an outlet end and an inlet end and adapted to mate with and open said check valve to form a continuous conduit from said first end of said vent tube to said outlet end of said extension tube; and
      (iii) an acoustic sensor positioned to detect filling noise transmitted through said extension tube; and
   (c) signaling means responsive to changes in said filling noise transmitted through said vent tube when said first end becomes submerged in liquid.

2. The method of determining the level of liquid in a pressurized container comprising the steps of:
   (a) forming a conduit having a first end suspended at a predetermined level inside a pressurized container and a second end terminating outside said pressurized container by:
      (i) placing a check valve in the second end of said vent tube; and
      (ii) opening said check valve with an extension tube having an inlet end and an outlet end to form an enclosed conduit extending from the inlet end of said vent tube to the outlet end of said extension tube;
   (b) generating filling noise in said container by injecting liquid into said container;
   (c) detecting the filling noise transmitted through said conduit; and
   (d) generating a cut-off signal in response to changes in said filling noise detected when the first end of said conduit is submerged in liquid in said container.

3. Liquid level detection apparatus comprising:
   (a) a vent tube having a first end terminating inside an enclosed pressurized container and second end terminating outside said container and vented to atmosphere;
   (b) detection means positioned outside said enclosed pressurized container and said vent tube to detect filling noises generated by liquid entering said container and transmitted to atmosphere through said vent tube, said detection means comprising:
      (i) a check valve positioned to close the second end of said vent tube;
      (ii) a removable extension tube having an outlet end and an inlet end and adapted to mate with and open said check valve to form a continuous conduit from said first end of said vent tube to said outlet end of said extension tube; and
      (iii) an acoustic sensor positioned to detect filling noise transmitted through said extension tube; and
   (c) signaling means responsive to changes in said filling noise transmitted through said vent tube when said first end becomes submerged in liquid.

4. Liquid level detection apparatus comprising:
   (a) a vent tube having a first end terminating inside an enclosed pressurized container and a second end terminating outside said container;
   (b) detection means positioned outside said enclosed pressurized container and said vent tube to detect filling noises generated by liquid entering said container and transmitted through said vent tube, said detection means comprising:
      (i) a check valve positioned to close the second end of said vent tube;
      (ii) a removable extension tube having an outlet end and an inlet end and adapted to mate with and open said check valve to form a continuous conduit from said first end of said vent tube to said outlet end of said extension tube; and (iii) an acoustic sensor positioned to detect filling noise transmitted through said extension tube; and (c) signaling means responsive to changes in said filling noise transmitted through said vent tube when said first end becomes submerged in liquid.

5. The method of determining the level of liquid in a pressurized container comprising the steps of:

(a) forming a conduit including a vent tube having a first end suspended at a predetermined level inside a pressurized container and a second end terminating outside said pressurized container;

(b) placing a check valve in the second end of said vent tube;

(c) opening said check valve with an extension tube having an inlet end and an outlet end to form a continuous conduit extending from the inlet end of said vent tube to the outlet end of said extension tube;

(d) generating filling noise in said container by injecting liquid into said container;

(e) using detection means located outside said pressurized container and said conduit to detect filling noise transmitted through said conduit to the outside of said container; and (f) generating a cut-off signal in response to changes in said filling noise detected when the first end of said conduit becomes submerged in liquid in said container.

* * * * *